United States Patent
Lo et al.

(10) Patent No.: US 11,982,798 B2
(45) Date of Patent: May 14, 2024

(54) PROJECTION LENS AND PROJECTION APPARATUS

(71) Applicant: Coretronic Corporation, Hsin-Chu (TW)

(72) Inventors: Hsin-Hsiang Lo, Hsin-Chu (TW); Wei-Ting Wu, Hsin-Chu (TW); Fu-Ming Chuang, Hsin-Chu (TW); Chuan-Chung Chang, Hsin-Chu (TW); Ching-Chuan Wei, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 160 days.

(21) Appl. No.: 17/520,596

(22) Filed: Nov. 5, 2021

(65) Prior Publication Data

US 2022/0155569 A1    May 19, 2022

Related U.S. Application Data

(60) Provisional application No. 63/115,594, filed on Nov. 18, 2020.

(30) Foreign Application Priority Data

Jul. 29, 2021   (CN) .......................... 202110862172.X

(51) Int. Cl.
    *G02B 13/18*    (2006.01)
    *G02B 1/04*    (2006.01)
    (Continued)

(52) U.S. Cl.
    CPC .............. *G02B 13/18* (2013.01); *G02B 1/041* (2013.01); *G03B 21/28* (2013.01); *H04N 9/3197* (2013.01)

(58) Field of Classification Search
    CPC .... G03B 21/008; G03B 21/28; G03B 21/142; G03B 21/147; H04N 9/315; H04N 9/3105;
    (Continued)

(56) References Cited

U.S. PATENT DOCUMENTS 8,662,675 B2    3/2014    Destain
11,106,122 B2 *    8/2021    Wang .................... G02B 13/007
(Continued)

FOREIGN PATENT DOCUMENTS

CN    101086605    12/2007
CN    101165532    4/2008
(Continued)

OTHER PUBLICATIONS

"Search Report of Europe Counterpart Application", dated Apr. 28, 2022, p. 1-p. 6.
(Continued)

*Primary Examiner* — Sultan Chowdhury
(74) *Attorney, Agent, or Firm* — JCIPRNET

(57) ABSTRACT

A projection lens includes a first lens group, a second lens group and an aperture stop. The first lens group is disposed between a reduced side and a magnified side. The second lens is disposed between the first lens group and the magnified side. The second lens group has a light incident surface, a reflective surface and a light emitting surface, the light incident surface faces the first lens group, the light emitting surface faces a projection surface, the light incident surface, the light emitting surface and the first lens group are disposed at a single side of the reflective surface, and at least one of the light incident surface, the reflective surface and the light emitting surface is a freeform surface. The aperture stop is disposed between the first lens group and the second (Continued)

lens group. Moreover, a projection apparatus including the projection lens is also provided.

12 Claims, 6 Drawing Sheets

(51) Int. Cl.
  *G03B 21/28* (2006.01)
  *H04N 9/31* (2006.01)
(58) Field of Classification Search
  CPC .. H04N 9/3108; H04N 9/3141; H04N 9/3197; G02B 1/041; G02B 1/045; G02B 17/0852; G02B 17/0856; G02B 17/086; G02B 13/16; G02B 13/18; G02B 13/26
  See application file for complete search history.

(56) References Cited

U.S. PATENT DOCUMENTS

| | | | |
|---|---|---|---|
| 11,275,253 B2* | 3/2022 | Li | G03B 21/008 |
| 2002/0021498 A1 | 2/2002 | Ohtaka et al. | |
| 2004/0156117 A1 | 8/2004 | Takaura et al. | |
| 2014/0347740 A1* | 11/2014 | Nagatoshi | G02B 7/028 |
| | | | 359/663 |
| 2017/0003582 A1 | 1/2017 | Pan et al. | |
| 2018/0246302 A1* | 8/2018 | Minefuji | G02B 17/08 |
| 2019/0243226 A1 | 8/2019 | Matsuo | |
| 2020/0033715 A1 | 1/2020 | Morikuni | |
| 2020/0166737 A1* | 5/2020 | Amano | G03B 21/28 |
| 2020/0278600 A1* | 9/2020 | Yanagisawa | G02B 17/08 |

FOREIGN PATENT DOCUMENTS

| | | |
|---|---|---|
| CN | 101363957 | 2/2009 |
| CN | 101840139 | 9/2010 |
| CN | 102269918 | 12/2011 |
| CN | 104914651 | 9/2015 |
| CN | 105190395 | 12/2015 |
| CN | 105759405 | 7/2016 |
| CN | 107850828 | 3/2018 |
| CN | 109491060 | 3/2019 |
| CN | 209980002 | 1/2020 |
| CN | 110780434 | 2/2020 |
| CN | 110780435 | 2/2020 |
| CN | 111123481 | 5/2020 |
| CN | 111638589 | 9/2020 |
| CN | 111699429 | 9/2020 |
| EP | 3611548 | 2/2020 |
| JP | 2003177351 | 6/2003 |
| JP | 2004295107 | 10/2004 |
| TW | 201317704 | 5/2013 |
| TW | 201915535 | 4/2019 |

OTHER PUBLICATIONS

"Office Action of Taiwan Counterpart Application", dated Jan. 22, 2022, p. 1-p. 5.
"Office Action of China Counterpart Application", dated Oct. 19, 2023, p. 1-p. 10.

* cited by examiner

PROJECTION LENS AND PROJECTION APPARATUS

CROSS-REFERENCE TO RELATED APPLICATION

This application claims the priority benefits of U.S. provisional application Ser. No. 63/115,594, filed on Nov. 18, 2020, and China application serial no. 202110862172.X, filed on Jul. 29, 2021. The entirety of each of the above-mentioned patent applications is hereby incorporated by reference herein and made a part of this specification.

BACKGROUND

Technical Field

The disclosure relates to an optical lens and an optical apparatus, and more particularly to a projection lens and a projection apparatus.

Description of Related Art

Projectors have been widely used in home appliances, office equipment, game consoles, and the like, with an increasing demand for projectors developed to be thinner, lighter, shorter, and smaller. For example, compared to projectors using traditional light sources, pocket projectors using light-emitting diodes are small in size and light in weight, which may reduce space requirements and be easily carried.

In practical applications, for reducing space taken up by a projector, it is necessary to modify the mechanism of the projector to change traditional vertical projection to oblique projection, such that a projection image is deflected by a reflective mirror, and the deflected projection image may be projected onto a projection surface (such as a desktop, a floor, a wall, a screen, or the like) according to requirements. In the oblique projection architecture, a reference light of an outgoing light of the projector cannot be perpendicular to the projection surface, which is called oblique incidence and leads to keystone distortion of the projection image. Traditionally, in order to fix keystone distortion, software may be used to cut the distortion area of the projection image to achieve a distortion-free situation. However, this software correction method results in a reduction of resolution and a loss of luminance. In addition, another way to fix the keystone distortion is hardware correction, which is shifting the projection lens. However, this method increases the volume of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection lens, which is small in volume and may fix keystone distortion.

The disclosure provides a projection apparatus, which is small in volume and may fix keystone distortion.

The projection lens of the disclosure is configured to image an image beam provided by a light valve disposed on a reduced side onto a projection surface disposed on a magnified side. The light valve has an angle with the projection surface. The projection lens includes a first lens group, a second lens group, and an aperture stop. The first lens group is disposed between the reduced side and the magnified side and has a first optical axis. The second lens group is disposed between the first lens group and the magnified side. The second lens group at least has a light incident surface, a reflective surface, and a light emitting surface. The light incident surface faces the first lens group, and the light emitting surface faces the projection surface. The light incident surface, the light emitting surface, and the first lens group are disposed on a same side of the reflective surface, and at least one of the light incident surface, the reflective surface, and the light emitting surface is a freeform surface. The aperture stop is disposed between the first lens group and the second lens group. The light valve is configured to provide the image beam. The image beam sequentially passes through the first lens group, travels through the aperture stop, passes through the light incident surface of the second lens group, is reflected by the reflective surface of the second lens group, and passes through the light emitting surface of the second lens group to be transmitted to the projection surface. The first optical axis of the first lens group does not overlap with a center of the image beam.

The projection apparatus of the disclosure includes an illumination light source, a light valve, a projection surface, and the projection lens. The illumination light source is configured to provide an illumination beam. The light valve is disposed on a reduced side and is configured to convert the illumination beam into an image beam. The projection surface is disposed on a magnified side, and the light valve has an angle with the projection surface.

Based on the above, in the projection apparatus and the projection lens of an embodiment of the disclosure, at least one of the light incident surface, the reflective surface, and the light emitting surface of the second lens group of the projection lens is a freeform surface, and the first optical axis of the first lens group does not overlap with the center of the image beam. In this way, a round-trip common light path design may be realized, thereby reducing the overall thickness of the projection lens. In addition, since at least one of the light incident surface, the reflective surface, and the light emitting surface of the second lens group is a freeform surface, the projection lens may also make the focal length of the image beam corresponding to each angle of view different, thereby fixing the keystone distortion phenomenon.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
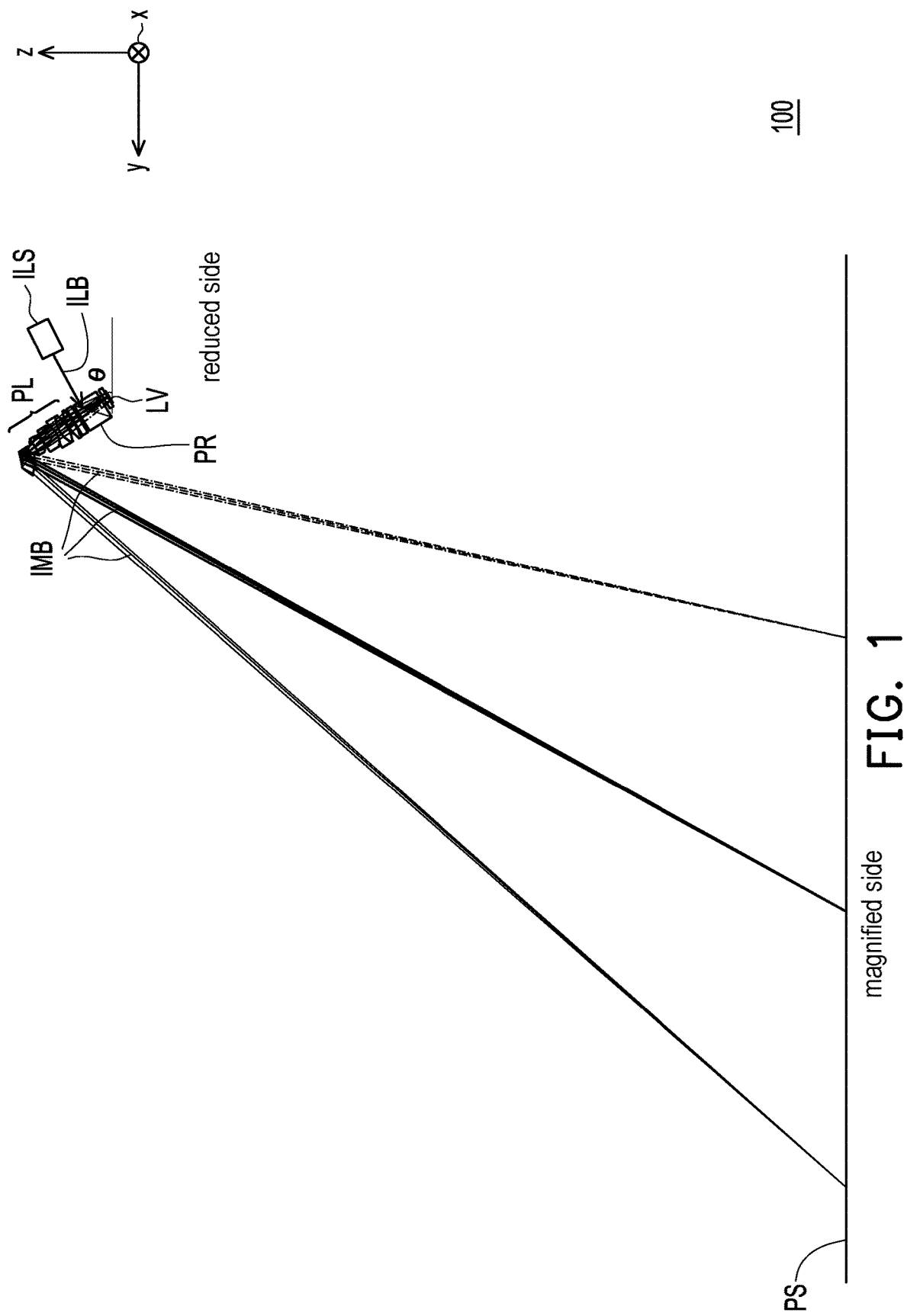
FIG. 1 is a schematic diagram of side view of a projection apparatus according to an embodiment of the disclosure.

The above and other technical contents, features and effects of the disclosure will be apparent from the following detailed description of a preferred embodiment with reference to the accompanying drawings. Directional wordings mentioned in the following embodiments, such as "up," "down," "left," "right," "front," and "back," merely refer to directions in the accompanying drawings. Therefore, the directional wordings are used to illustrate rather than limit the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

Figure 2:
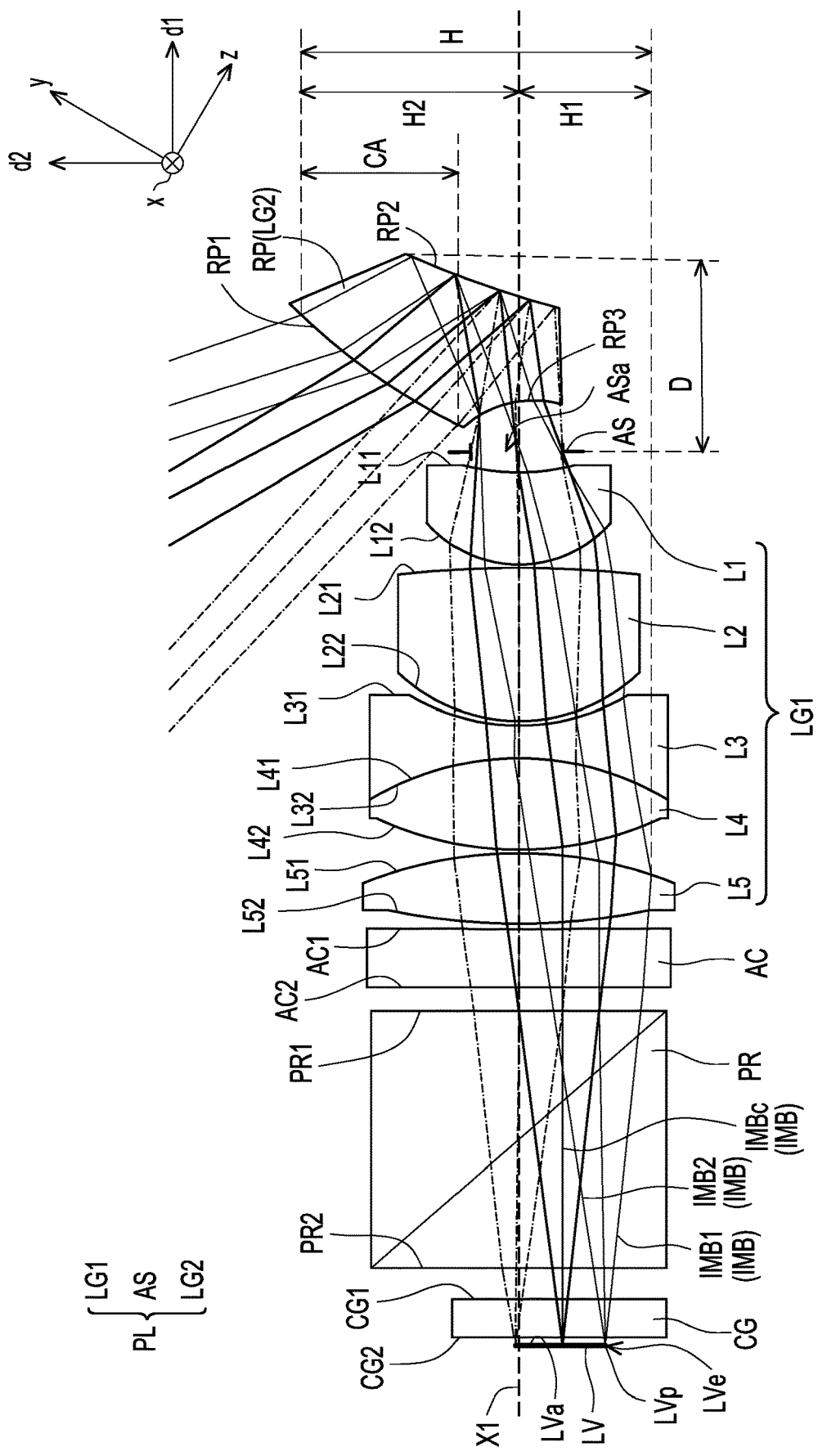
FIG. 2 is an enlarged schematic diagram of a light valve, a protection cover, a light combining element, a plate glass actuator, and a projection lens of the projection apparatus in FIG. 1.

FIG. 1 is a schematic diagram of side view of a projection apparatus according to an embodiment of the disclosure. FIG. 2 is an enlarged schematic diagram of a light valve, a protection cover, a light combining element, a plate glass actuator, and a projection lens of the projection apparatus in FIG. 1.

With reference to FIG. 1 and FIG. 2, a direction z is, for example, a direction perpendicular to a projection surface PS, a direction y is, for example, a direction parallel to the projection surface PS, and a direction x is, for example, a direction parallel to the projection surface PS and perpendicular to the direction y.

With reference to FIG. 1, a projection apparatus 100 includes an illumination light source ILS, a light valve LV, a projection lens PL, and the projection surface PS. The projection lens PL has a reduced side and a magnified side. The light valve LV is disposed on the reduced side. The projection surface PS is disposed on the magnified side. The illumination light source ILS is configured to provide an illumination beam ILB. The light valve LV is configured to convert the illumination beam ILB into an image beam IMB. The projection lens PL is configured to image the image beam IMB from the light valve LV onto the projection surface PS on the magnified side. In particular, the projection surface PS and the light valve LV have an included angle θ. In other words, the projection apparatus 100 is an oblique projection apparatus. The included angle θ of the projection surface PS and the light valve LV satisfies: 0°<θ<90°. For example, the included angle θ may satisfy: 25°<θ<90° but the disclosure is not limited thereto.

The projection surface PS generally refers to an object surface on which a projection image may be formed. For example, in this embodiment, the projection surface PS may be a desktop, but the disclosure is not limited thereto. In other embodiments, the projection surface PS may also be a ground, a wall, a screen, or the like.

In this embodiment, the light valve LV may optionally be a reflective optical modulator, such as a digital micro-mirror device, a liquid-crystal-on-silicon (LCOS) panel, or the like, but the disclosure is not limited thereto. In other embodiments, the light valve IN may also be a transmissive optical modulator, such as a transparent liquid crystal panel, an electro-optical modulator, a magneto-optic modulator, an acousto-optic modulator (AOM), or the like.

In this embodiment, the projection apparatus 100 may further optionally include a light combining element PR. The illumination light source ILS emits the illumination beam ILB to the light combining element PR. The illumination beam ILB is transmitted through the light combining element PR to the light valve LV. The light valve LV reflects the illumination beam ILB into the image beam IMB, and the image beam IMB is transmitted through the light combining element PR to the projection lens PL. For example, in this embodiment, the light combining element PR may be a total internal reflection (TIR) prism, but the disclosure is not limited thereto. In other embodiments, the light combining element PR may also be a beam splitter, a polarizer beam splitter, a field lens, or other optical elements, which depends on the design of light splitting or light guiding required by the projection apparatus 100 and is not limited by the disclosure.

With reference to FIG. 1 and FIG. 2, in this embodiment, the projection apparatus 100 may further optionally include a protection cover CG (shown in FIG. 2), disposed on a light receiving surface LVa of the light valve LV (shown in FIG. 2) and located between the light valve LV and the light combining element PR. The protection cover CG is configured to protect the light valve LV. In addition, in this embodiment, the projection apparatus 100 may optionally include a plate glass actuator AC, which may have a light filtering function.

The projection lens PL includes a first lens group LG1, an aperture stop AS, and a second lens group LG2. The first lens group LG1 is disposed between the reduced side and the magnified side and has a first optical axis X1. The second lens group LG2 is disposed between the first lens group LG1 and the magnified side. The aperture stop AS is disposed between the first lens group LG1 and the second lens group LG2. The second lens group LG2 at least has a light incident surface RP3, a reflective surface RP2, and a light emitting surface RP1. The light incident surface RP3 faces the first lens group LG1, the light emitting surface RP1 faces the projection surface PS, and the light incident surface RP3, the light emitting surface RP1, and the first lens group LG1 are disposed on a same side of the reflective surface RP2.

With reference to FIG. 2, the first lens group LG1 includes multiple lenses L1, L2, L3, L4, and L5 arranged in sequence from the magnified side to the reduced side, and each of the lenses L1, L2, L3, L4, and L5 respectively has a first surface L11, L21, L31, L41, and L51 facing the second lens group LG2 and a second surface L12, L22, L32, L42, and L52 facing the light valve LV.

For example, in this embodiment, the first lens group LG1 includes the lens L1, the lens L2, the lens L3, the lens L4, and the lens L5 arranged in sequence from the magnified side to the reduced side. The lens L1 has the first surface L11 facing the second lens group LG2 and the second surface L12 facing the light valve LV. The lens L2 has the first surface L21 facing the second lens group LG2 and the second surface L22 facing the light valve LV. The lens L3 has the first surface L31 facing the second lens group LG2 and the second surface L32 facing the light valve LV. The lens L4 has the first surface L41 facing the second lens group LG2 and the second surface L42 facing the light valve LV. The lens L5 has the first surface L51 facing the second lens group LG2 and the second surface L52 facing the light valve LV. In this embodiment, for example, the number of the multiple lenses L1, L2, L3, L4, and L5 of the first lens group LG1 is 5, but the disclosure is not limited thereto. The number of the lenses in the first lens group LG1 may vary according to actual requirements. In other embodiments, the number of the lenses in the first lens group LG1 may also be 2, 3, 4, 6, or a positive integer greater than 6. In this embodiment, the focal length of the first lens group LG1 may be a negative value, but the disclosure is not limited thereto.

The aperture stop AS refers to an entity restricting the image beam IMB in the projection lens PL. A light beam has the smallest cross-sectional area through the aperture stop AS, which may be an edge or a frame of a lens, or a particularly set aperture screen. For example, in this embodiment, the aperture stop AS is an aperture screen disposed between the first lens group LG1 and the second lens group LG2, but the disclosure is not limited thereto. In this embodiment, the first surface L11 of the lens L1 closest to the aperture stop AS among the multiple lenses L1, L2, L3, L4, and L5 of the first lens group LG1 may be a freeform surface.

In this embodiment, the second lens group LG2 may include a deflecting prism RP, and the deflecting prism RP has the light incident surface RP3, the reflective surface RP2, and the light emitting surface RP1. In this embodiment, the light incident surface RP3 of the deflecting prism RP may be a concave surface, and the light emitting surface RP1 of the deflecting prism RP may be a convex surface.

In addition, at least one of the light incident surface RP3, the reflective surface RP2, and the light emitting surface RP1 of the second lens group LG2 is a freeform surface, and the first optical axis X1 of the first lens group LG1 does not overlap with a center IMBc of the image beam IMB. In this way, a round-trip common light path design may be realized, which means the light path along which the image beam IMB is transmitted from the first lens group LG1 to the second lens group LG2 and the light path along which the image beam IMB is reflected by the reflective surface RP2 of the second lens group LG2 back to the first lens group LG1 may overlap, and the image beam IMB reflected by the reflective surface RP2 of the second lens group LG2 may have enough space to emit from the light incident surface RP3 of the second lens group LG2. Since the projection lens PL has the common light path design, the image beam IMB reflected by the reflective surface RP2 of the second lens group LG2 back to the first lens group LG1 is unlikely to cause interference. Therefore, a maximum distance D between the aperture stop AS and the reflective surface RP2 of the second lens group LG2 in a direction d1 parallel to the first optical axis X1 may be shortened. As the maximum distance D is shortened, a clear aperture CA of the reflective surface RP2 of the second lens group LG2 is not excessively large. In this way, an overall thickness H of the projection lens PL may be reduced.

With reference to FIG. 2, the image beam IMB includes a first edge light IMB1 and a second edge light IMB2. The first edge light IMB1 emits from a point LVp on an edge LVe of the light valve LV along a direction away from the first optical axis X1. The second edge light IMB2 emits from the point LVp on the edge LVe of the light valve LV along a direction pointing to the first optical axis X1. The first edge light IMB1 in the first lens group LG1 and the first optical axis X1 have a maximum distance H1 in a direction d2 perpendicular to the first optical axis X1. The second edge light IMB2 on the light emitting surface RP1 and the first optical axis X1 of the second lens group LG2 have a maximum distance H2 in the direction d2 perpendicular to the first optical axis X1. The overall thickness H of the projection lens PL mentioned above refers to a sum of the maximum distance H1 and the maximum distance H2. For example, in this embodiment, the overall thickness H of the projection lens PL may be less than 12 mm, but the disclosure is not limited thereto.

The aperture stop AS and the reflective surface RP2 of the second lens group LG2 have the maximum distance D in the direction d1 parallel to the first optical axis X1. In this embodiment, H/D<3. In addition, in this embodiment, the light emitting surface RP1 of the second lens group LG2 has a clear aperture CA, and CA/D<3. In other words, the ratio of the overall thickness H of the projection lens PL to the maximum distance) between the aperture stop AS and the reflective surface RP2, and the ratio of the clear aperture CA of the light emitting surface RP1 of the second lens group LG2 to the maximum distance D between the aperture stop AS and the reflective surface RP2 are both below an appropriate value. This design method may reduce the volume of the projection lens PL.

In addition, since at least one of the light incident surface RP3, the reflective surface RP2, and the light emitting surface RP1 of the second lens group LG2 is a freeform surface, the second lens group LG2 may further make the focal length of the image beam IMB corresponding to each angle of view different, thereby fixing the keystone distortion phenomenon. In this embodiment, the light incident surface RP3, the reflective surface RP2, and the light emitting surface RP1 of the second lens group LG2 may all be freeform surfaces, but the disclosure is not limited thereto. In another embodiment, the light emitting surface RP1 and the reflective surface RP2 of the second lens group LG2 may be freeform surfaces, and the light incident surface RP3 may not be a freeform surface. In still another embodiment, the reflective surface RP2 and the light incident surface RP3 of the second lens group LG2 may be freeform surfaces, and the light emitting surface RP1 may not be a freeform surface. In this embodiment, the focal length of the second lens group LG2 is, for example, a positive value.

In this embodiment, the image beam IMB has an offset value O relative to the first optical axis X1 of the first lens group LG1. The measurement method of the offset value O is described below with FIG. 3.

Figure 3:
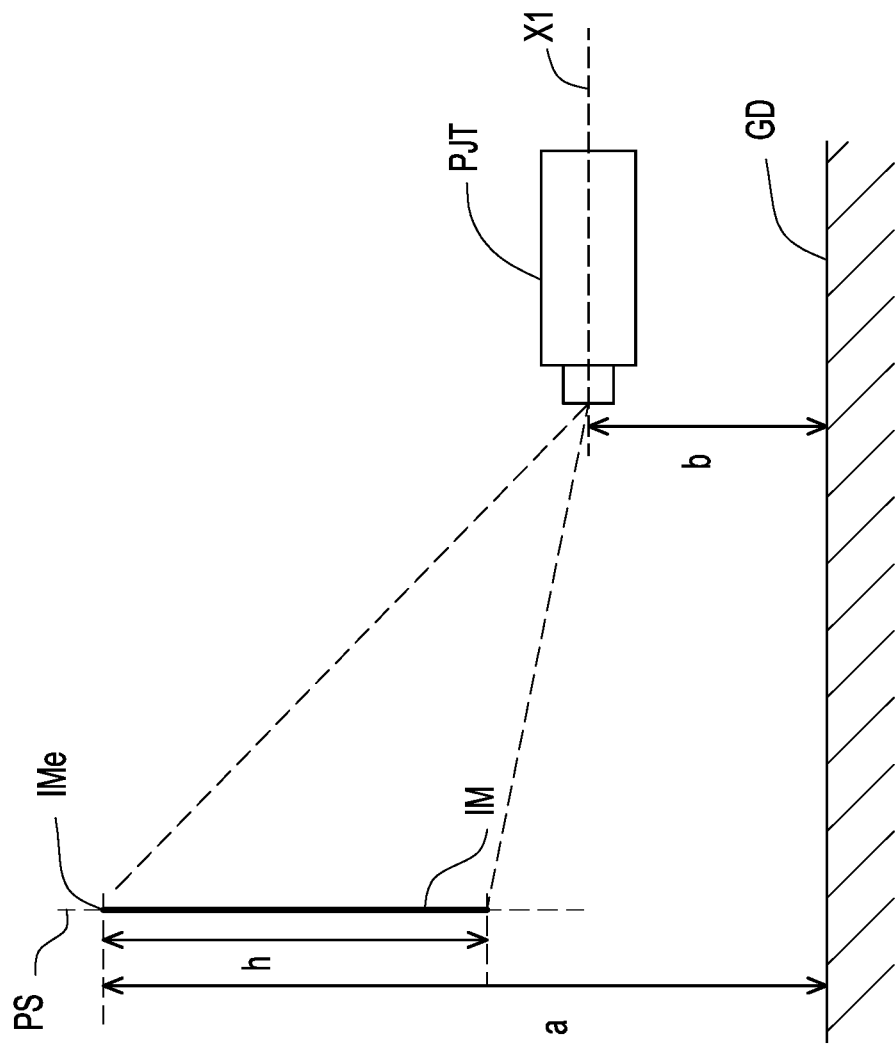
FIG. 3 is a schematic diagram of a projection apparatus according to an embodiment of the disclosure.

FIG. 3 is a schematic diagram of a projection apparatus according to an embodiment of the disclosure. With reference to FIG. 1 and FIG. 3, a projector PJT of FIG. 3 at least includes the illumination light source ILS, the light valve LV, and the projection lens PL of FIG. 1, and the projector PJT is configured to form a projection image IM onto the projection surface PS. With reference to FIG. 3, in the measurement method of the offset value O, first, the levelness of the projector PJT is corrected, such that the first optical axis X1 of the projector PJT is level with a ground GD. Next, as the first optical axis X1 of the projector PJT remains level with the ground GD, the projection image IM is projected by the projector PJT onto the projection surface PS. In following, a height h of the projection image IM, a distance a from an edge IMe away from the ground GD of the projection image IM to the ground GD, and a distance b from the first optical axis X1 of the projector PJT to the ground (G) are measured. Finally, the following equation:

$O=[(ab)/h] \cdot 100\%$ is used to calculate the offset value O of the image beam IMB relative to the first optical axis X1 of the first lens group LG1. For example, in this embodiment, O may be greater than 50%, but the disclosure is not limited thereto.

Figure 4:
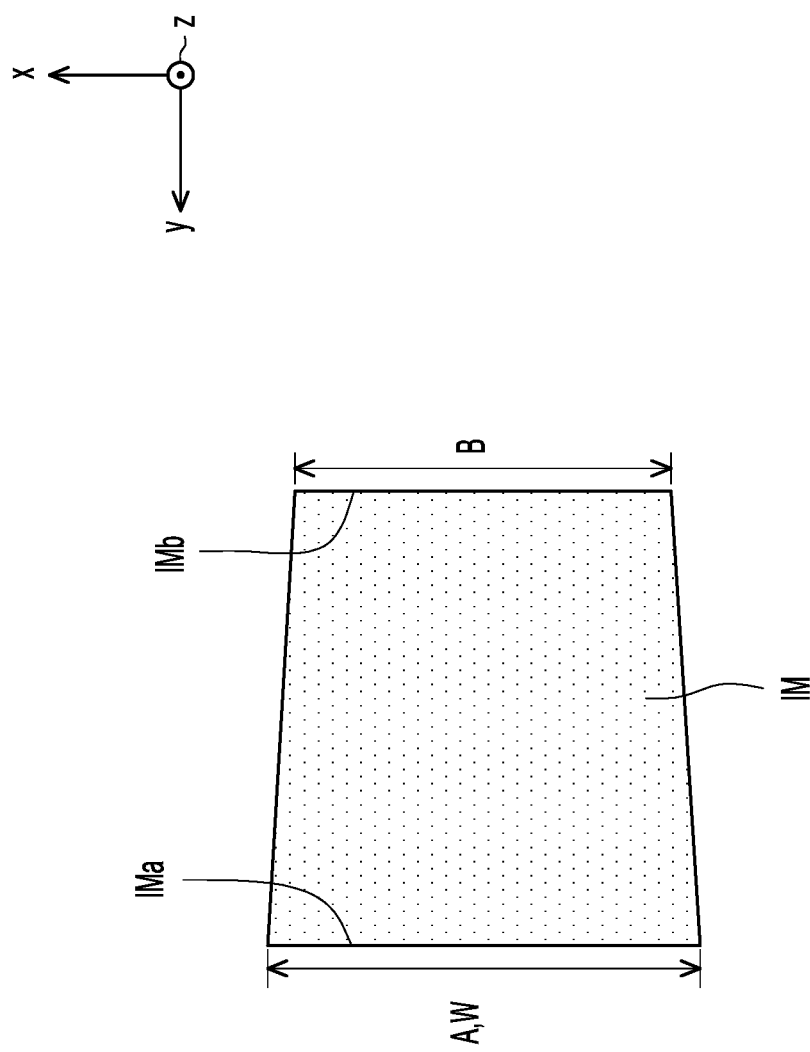
FIG. 4 schematically illustrates a projection image formed on a projection surface by an image beam of an embodiment of the disclosure.

FIG. 4 schematically illustrates a projection image formed on a projection surface by an image beam of an embodiment of the disclosure. With reference to FIG. 1, FIG. 2, and FIG. 4, in this embodiment, the light valve LV converts the illumination beam ILB into the image beam IMB. The image beam IMB sequentially passes through the first lens group LG1, travels through the aperture stop AS, passes through the light incident surface RP3 of the second lens group LG2, is reflected by the reflective surface RP2 of the second lens group LG2, passes through the light emitting surface RP1 of the second lens group LG2, and forms the projection image IM onto the projection surface PS (i.e., a paper in FIG. 4). Two opposite sides IMa and 1 Mb of the projection image IM are parallel to each other and have a length A and a length B on a direction x respectively. The projection image IM has a maximum width W in the direction x, where $[(B-A)/W] \cdot 100\% = T$, and $|T| < 1\%$. In short, in this embodiment, keystone distortion of the projection image IM is less than 1%.

An embodiment of the projection apparatus 100 is provided hereinafter. It should be noted that data listed in Table 1 to Table 3 are not intended to limit the disclosure, and any person skilled in the art may make appropriate changes to the parameters or settings after referring to the disclosure, which are still considered to be within a scope of the disclosure.

For the curvature radius, space, refractive index, Abbe number and material corresponding to each surface/element in Table 1, please refer to the corresponding values and contents of the curvature radius, space, refractive index, Abbe number and material in the same column. In addition, in Table 1, RP1 is the light emitting surface of the second lens group LG2, RP2 is the reflective surface of the second lens group LG2, and RP3 is the light incident surface of the second lens group LG2. L11 is the first surface of the first lens L1 facing the second lens group LG2, and L12 is the second surface of the first lens L1 facing the light valve LV. ASa is a light passing cross section of the aperture stop AS. L21 is the first surface of the second lens L2 facing the second lens group LG2, and L22 is the second surface of the second lens L2 facing the light valve LV. L31 is the first surface of the third lens L3 facing the second lens group LG2. L41 is the first surface of the fourth lens L4 facing the second lens group LG2, and L42 is the second surface of the fourth lens L4 facing the light valve LV. L51 is the first surface of the fifth lens L5 facing the second lens group LG2, and L52 is the second surface of the fifth lens L5 facing the light valve LV. L61 is the first surface of the sixth lens L6 facing the second lens group LG2. AC1 is a first surface of the plate glass actuator AC facing the second lens group LG2, and AC2 is a second surface of the plate glass actuator AC facing the light valve LV. PR1 is a first surface of the light combining element PR facing the second lens group LG2, and PR2 is a second surface of the light combining element PR facing the light valve LV. CG1 is a first surface of the protection cover CG facing the second lens group LG2, CG2 is a second surface of the protection cover CG facing the light valve LV, and LVa is the light receiving surface of the light valve LV.

With reference to FIG. 2 and Table 1, in this embodiment, the first lens L1 may be a freeform surface lens. In detail, the first surface L11 of the first lens L1 facing the second lens group LG2 may be a freeform surface, and the second

TABLE 1

| surface | element | type | curvature radius (mm) | space (Mm) | refractive index (Nd) | Abbe number (Vd) | material |
|---|---|---|---|---|---|---|---|
| RP1 | second lens group LG2 | freeform surface | 31.844 | 4.988 | 1.535 | 55.8 | |
| RP2 | | freeform surface | 10.596 | −2.227 | | | |
| RP3 | | freeform surface | −3.432 | −5.179 | | | |
| ASa | aperture stop AS | | infinity | −0.571 | | | |
| L11 | first lens L1 | freeform surface | 12.609 | −3.509 | 1.653 | 22.4 | plastic |
| L12 | | aspheric | 4.992 | −0.1 | | | |
| L21 | second lens | spherical | 118.405 | −6.493 | 1.49 | 70.2 | glass |
| L22 | L2 | spherical | 7.258 | −0.1 | | | |
| L31 | third lens L3 | spherical | 19.17 | −1.1 | 1 . . . 858 | 24.1 | glass |
| L41 | fourth lens | spherical | −5.713 | −2.258 | 1.651 | 56.8 | glass |
| L42 | L4 | spherical | −15.755 | −0.1 | | | |
| L51 | fifth lens L5 | aspheric | −7.113 | −4.982 | 1.535 | 55.8 | plastic |
| L52 | | aspheric | 8.962 | −0.8 | | | |
| AC1 | plate glass | | infinity | −2 | 1.526 | 58.6 | glass |
| AC2 | actuator AC | | infinity | −0.8 | | | |
| PR1 | light combining element PR | | infinity | −8.4 | 1.842 | 43 | |
| PR2 | | | infinity | −1 | | | |
| CG1 | protection cover CG | | infinity | −1.1 | 1.151 | 61 | glass |
| CG2 | | | infinity | −0.303 | | | |
| LVa | light valve LV | | infinity | 0 | | | |

Table 1 lists various parameters of the projection apparatus 100 according to an embodiment of the disclosure. With reference to FIG. 2 and Table 1, the space in Table 1 refers to a straight distance between two adjacent surfaces on the optical axis X. For example, the space of the first surface L11 is a straight distance between the first surface L11 and the second surface L12 on the first optical axis X1.

surface L12 of the first lens L1 facing the light valve LV may be aspheric. In this embodiment, the second lens L2 may be a spherical lens. The first surface L21 of the second lens L2 facing the second lens group LG2 and the second surface L22 of the second lens L2 facing the light valve LV may both be spherical.

In this embodiment, the third lens L3 may be a spherical lens. The first surface L31 of the third lens L3 facing the second lens group LG2 and the second surface L32 of the third lens L3 facing the light valve IN may both be spherical. In this embodiment, the fourth lens L4 may be a spherical lens. The first surface L41 of the fourth lens L4 facing the second lens group LG2 and the second surface L42 of the fourth lens L4 facing the light valve LV may both be spherical. In addition, in this embodiment, the second surface L32 of the third lens L3 and the first surface L41 of the fourth lens L4 may be glued together for the third lens L3 and the fourth lens L4 to form a cemented doublet lens.

In this embodiment, the fifth lens L5 may be an aspheric lens. In detail, the first surface L51 of the fifth lens L5 facing the second lens group LG2 and the second surface L52 of the fifth lens L5 facing the light valve LV may both be aspheric.

The second surface L12 of the first lens L1, the first surface L51 of the fifth lens L5, and the second surface L52 of the fifth lens L5 mentioned above are even aspheric, which may be represented by the following equation:

$$Z = \frac{cr^2}{1+\sqrt{1-(1+k)c^2r^2}} + A_2 r^2 + A_4 r^4 + A_6 r^6 + A_8 r^8 \ldots$$

In the equation, Z is the sag along the direction of the optical axis X, and c is the reciprocal of the radius of an osculating sphere, which is the reciprocal of the curvature radius close to the optical axis X, such as the curvature radius in Table 1. k is a conic coefficient, r is the height of an aspheric surface, which is the height from the center of the lens to the edge of the lens, and $A_2, A_4, A_6, A_8, \ldots$ are aspheric coefficients. Table 2 lists conic coefficients of the second surface L12 of the first lens L1, the first surface L51 of the fifth lens L5, and the second surface L52 of the fifth lens L5 and each aspheric coefficient.

TABLE 2

| | surface | | |
|---|---|---|---|
| | L12 | L51 | L52 |
| conic coefficient k | 0.133 | −2.846 | 0.381 |
| coefficient $A_4$ | 4.81550E−04 | 2.31310E−05 | −1.50680E−04 |
| coefficient $A_6$ | −3.84030E−07 | 2.99620E−06 | 4.90730E−07 |
| coefficient $A_8$ | | −8.60850E−09 | 2.97760E−08 |

With reference to FIG. 2 and Table 1, in this embodiment, the light emitting surface RP1 of the second lens group LG2, the reflective surface RP2 of the second lens group LG2, the light incident surface RP3 of the second lens group LG2, and the first surface L11 of the first lens L1 are freeform surfaces, which may be represented by the following equation:

$$Z = \frac{(1/r) \times \phi^2}{1+\sqrt{1-(1+k) \times \left(\frac{\phi}{r}\right) c^2 r^2}} + \sum c_{mn} x^m y^n$$

In the equation, Z is the optical surface depth, r is the curvature radius, k is a conic constant, Φ is the lens aperture, and $C_{mn}$ is a coefficient of xy polynomials. The corresponding freeform surface may be established according to the curvature radius in Table 1, the coefficient of the $x^m y^n$ polynomials in Table 3, and the corresponding expansion above.

TABLE 3

| $x^m y^n$ polynomial coefficient | RP1 | RP2 | RP3 | L11 |
|---|---|---|---|---|
| y polynomial coefficient | 3.73960E−01 | 4.56960E−02 | −4.65100E−01 | −4.85000E−02 |
| $x^2$ polynomial coefficient | −4.32410E−02 | −4.31610E−02 | 5.70580E−02 | 1.46790E−02 |
| $y^2$ polynomial coefficient | −9.75230E−02 | −4.53500E−02 | 5.66030E−02 | 1.29000E−02 |
| $x^2 y$ polynomial coefficient | −7.04390E−04 | −1.19130E−04 | −1.16570E−02 | −2.55610E−03 |
| $y^3$ polynomial coefficient | 1.06880E−02 | 8.07920E−04 | −1.31230E−02 | −2.83740E−03 |
| $x^4$ polynomial coefficient | 1.21800E−03 | −4.48560E−05 | 1.46620E−04 | 3.44080E−03 |
| $x^2 y^2$ polynomial coefficient | 2.68250E−03 | −6.48470E−05 | 1.59640E−03 | 6.88920E−03 |
| $y^4$ polynomial coefficient | 5.45350E−04 | −1.81930E−04 | −1.76290E−04 | 3.45130E−03 |
| $x^4 y$ polynomial coefficient | −5.36970E−05 | −3.41710E−06 | −5.66890E−04 | −2.03770E−04 |
| $x^2 y^3$ polynomial coefficient | −2.47210E−04 | 1.01700E−04 | −8.99270E−04 | −4.59070E−04 |
| $y^5$ polynomial coefficient | −2.05140E−04 | 2.57940E−06 | −3.32560E−04 | −2.27020E−04 |
| $x^6$ polynomial coefficient | −3.20420E−05 | −1.60010E−05 | 3.44260E−05 | 1..95360E−04 |
| $x^4 y^2$ polynomial coefficient | −7.08860E−05 | −2.84000E−05 | −2.30490E−04 | 5.62460E−04 |
| $x^2 y^4$ polynomial coefficient | −1.48630E−05 | −8.81300E−05 | −1.12350E−03 | 5.47330E−04 |

TABLE 3-continued

| $x^m y^n$ polynomial coefficient | RP1 | RP2 | RP3 | L11 |
|---|---|---|---|---|
| $y^6$ polynomial coefficient | 1.90740E−05 | −8.43360E−06 | −5.09320E−04 | 1.73550E−04 |
| $x^6 y$ polynomial coefficient | 5.30600E−06 | 8.41480E−06 | 8.61970E−05 | 1.70500E−05 |
| $x^4 y^3$ polynomial coefficient | 1.05270E−05 | −.73400E−06 | 2.33610E−06 | 3.15430E−05 |
| $x^2 y^5$ polynomial coefficient | 4.85560E−08 | 1.84170E−05 | 6.86320E−05 | 5.86140E−05 |
| $y^7$ polynomial coefficient | −7.55950E−07 | 1.76990E−06 | −1.64650E−04 | 1.54730E−05 |
| $x^8$ polynomial coefficient | 4.66660E−07 | 8.12190E−07 | 5.57060E−06 | −4.12740E−06 |
| $x^6 y^2$ polynomial coefficient | 6.93520E−07 | 8.34820E−07 | 7.47250E−05 | −1.60850E−05 |
| $x^4 y^4$ polynomial coefficient | −7.36010E−08 | 5.02340E−06 | 2.20920E−04 | −2.82570E−06 |
| $x^2 y^6$ polynomial coefficient | 3.24650E−07 | 1.32680E−07 | 3.26260E−04 | −5.3.2250E−06 |
| $y^8$ polynomial coefficient | 8.69560E−09 | 1.68230E−07 | 2.06690E−04 | 1.23870E−06 |
| $x^8 y$ polynomial coefficient | −9.23210E−08 | −5.82240E−07 | −1.16650E−05 | −6.99950E−06 |
| $x^6 y^3$ polynomial coefficient | −1.12780E−07 | −5.98200E−07 | −4.10250E−05 | −1.68450E−05 |
| $x^4 y^5$ polynomial coefficient | −4.50550E−08 | −1.20390E−06 | −1.97560E−05 | −3.08280E−05 |
| $x^2 y^7$ polynomial coefficient | 5.45590E−08 | −4.34210E−07 | 1.33260E−06 | −2.25730E−05 |
| $y^9$ coefficient | −3.93740E−09 | −5.41920E−08 | 4.13600E−05 | −4.93650E−06 |
| $x^{10}$ coefficient | −4.46580E−10 | 4.26590−E09 | 1.55260E−06 | 1.42660E−06 |
| $x^8 y^2$ coefficient | −6.30810E−11 | 7.55270E−08 | −1.35870E−06 | 8.27570E−06 |
| $x^6 y^4$ coefficient | 2.68880E−09 | 5.00410E−08 | −4.04550E−06 | 1.04590E−05 |
| $x^4 y^6$ coefficient | 3.74200E−10 | 8.73540E−08 | −3.37610E−05 | 1.24310E−05 |
| $x^2 y^8$ coefficient | −7.57250E−09 | 3.41710E−08 | −4.32090E−05 | 6.61670E−06 |
| $y^{10}$ coefficient | 1.14070E−09 | 2.49110E−09 | −3.08130E−05 | 1.18280E−06 |

In this embodiment, the projection lens PL, has a large half angle of view; that is, the projection lens PL has a small projection ratio and may project a wide projection image within a short projection distance. For example, in this embodiment, the half angle of view of the projection lens PL may be greater than 45°, but the disclosure is not limited thereto.

Figure 5:
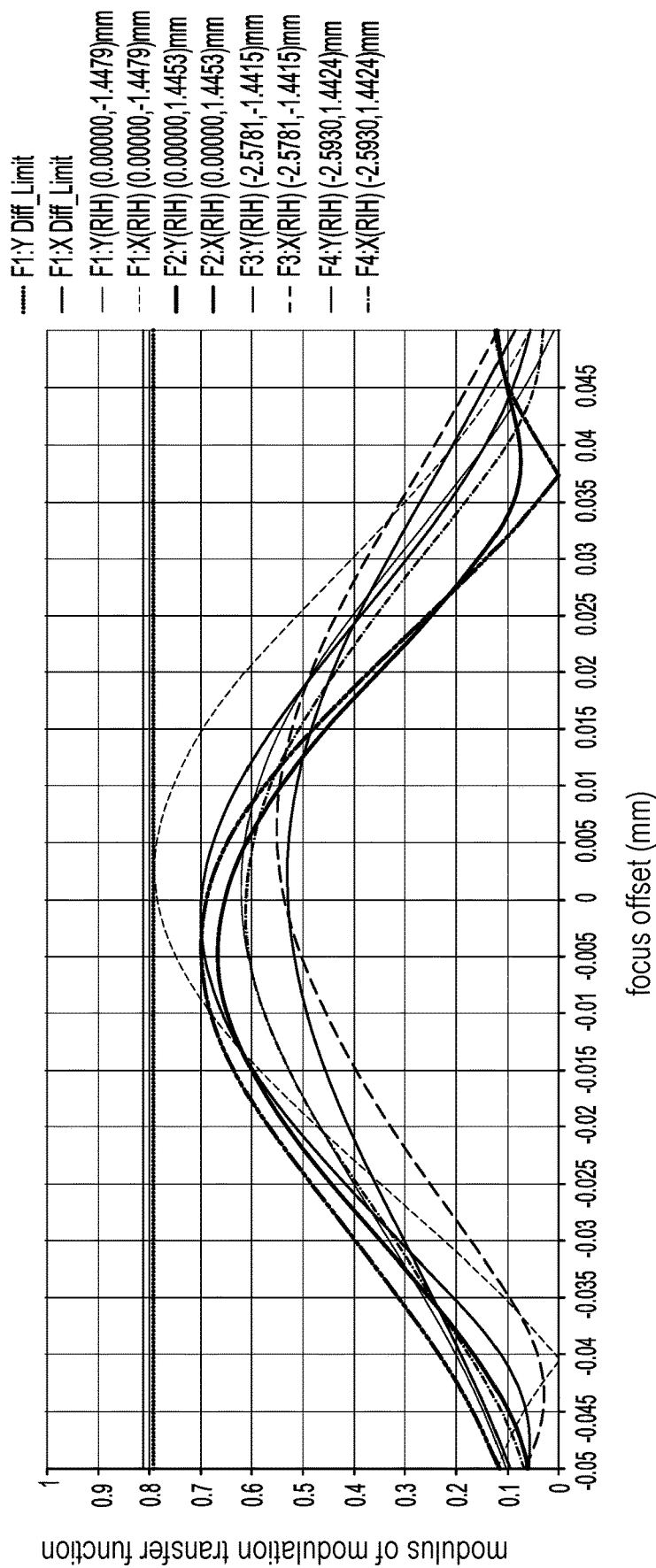
FIG. 5 is a modulation transfer function diagram of the projection lens in FIG. 2.

FIG. 5 is a modulation transfer function diagram of the projection lens in FIG. 2. The modulation transfer function (MTF) diagram in FIG. 5 may be used to evaluate the performance of the projection lens PL, and the lines shown in FIG. 5 are all within the standard range. Therefore, it may be verified that the projection lens PL of this embodiment can achieve good imaging effects.

Figure 6:
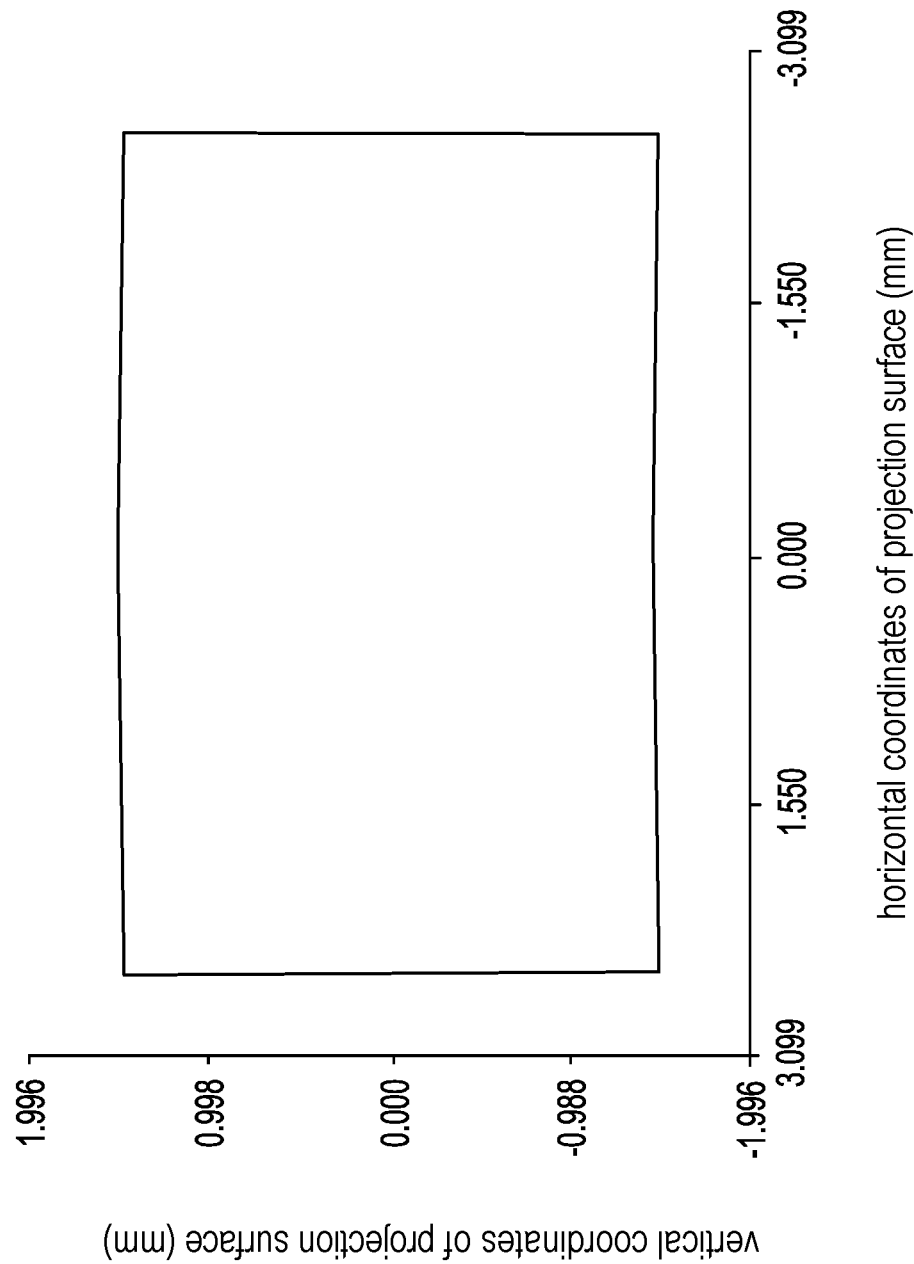
FIG. 6 schematically illustrates a projection image on a projection surface of the projection apparatus in FIG. 1.

FIG. 6 schematically illustrates the projection image on the projection surface of the projection apparatus in FIG. 1. The shape of the projection image IM shown in FIG. 6 is close to a rectangle. According to FIG. 6, it may be verified that the projection apparatus 100 using the asymmetric freeform surface of the optical element of the projection lens PL (such as at least one of the light emitting surface RP1, the reflective surface RP2, and the light incident surface RP3 of the second lens group LG2) can effectively fix keystone distortion.

In summary, the projection apparatus and the projection lens of the embodiment of the disclosure include the first lens group disposed between the reduced side and the magnified side, the second lens group disposed between the first lens group and the magnified side, and the aperture stop disposed between the first lens group and the second lens group. The second lens group has the light incident surface, the reflective surface, and the light emitting surface. The light incident surface faces the first lens group, the light emitting surface faces the projection surface, and the light incident surface, the light emitting surface, and the first lens group are disposed on the same side of the reflective surface. The light valve is configured to provide the image beam. The image beam sequentially passes through the first lens group, travels through the aperture stop, passes through the light incident surface of the second lens group, is reflected by the reflective surface of the second lens group, and passes through the light emitting surface of the second lens group to be transmitted to the projection surface. In particular, at least one of the light incident surface, the reflective surface, and the light emitting surface of the second lens group is a freeform surface, and the first optical axis of the first lens group does not overlap with the center of the image beam. In this way, the projection lens may have a common light path design. Since the projection lens has the common light path design, the image beam reflected by the reflective surface of the second lens group back to the first lens group is unlikely to cause interference, and the distance between the aperture stop and the reflective surface of the second lens group may be shortened. As the distance between the aperture stop and the reflective surface of the second lens group is shortened, the clear aperture of the reflective surface RP2 of the second lens group LG2 is not excessively large. In this way, the overall thickness and volume of the projection lens may be effectively reduced.

The above are only preferred embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents and are not intended to limit the scope of the disclosure. In addition, the terms "first," "second." and the like mentioned in the specification or the claims are used only to name the elements or to distinguish different embodiments or scopes and are not intended to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens, configured to image an image beam provided by a light valve disposed on a reduced side onto a projection surface disposed on a magnified side, wherein the light valve has an angle with the projection surface, and the projection lens comprises a first lens group, a second lens group, and an aperture stop, wherein
    the first lens group is disposed between the reduced side and the magnified side and has a first optical axis;
    the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and
    the aperture stop is disposed between the first lens group and the second lens group, wherein the light valve is configured to provide the image beam, the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;
    wherein the second lens group comprises a deflecting prism, and the deflecting prism has the light incident surface, the reflective surface, and the light emitting surface.

2. The projection lens according to claim 1, wherein the image beam has an offset value relative to the first optical axis of the first lens group.

3. The projection lens according to claim 1, wherein the angle is θ, and 25°<θ<90°.

4. A projection lens, configured to image an image beam provided by a light valve disposed on a reduced side onto a projection surface disposed on a magnified side, wherein the light valve has an angle with the projection surface, and the projection lens comprises a first lens group, a second lens group, and an aperture stop, wherein
    the first lens group is disposed between the reduced side and the magnified side and has a first optical axis;
    the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and
    the aperture stop is disposed between the first lens group and the second lens group, wherein the light valve is configured to provide the image beam, the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;
    wherein the first lens group comprises a plurality of lenses arranged in sequence from the magnified side to the reduced side, each of the plurality of lenses has a first surface facing the second lens group and a second surface facing the light valve, and a first surface of a lens closest to the aperture stop among the plurality of lenses is a freeform surface.

5. A projection lens, configured to image an image beam provided by a light valve disposed on a reduced side onto a projection surface disposed on a magnified side, wherein the light valve has an angle with the projection surface, and the projection lens comprises a first lens group, a second lens group, and an aperture stop, wherein the first lens group is disposed between the reduced side and the magnified side and has a first optical axis;

the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and the aperture stop is disposed between the first lens group and the second lens group, wherein the light valve is configured to provide the image beam, the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;

wherein the aperture stop and the reflective surface of the second lens group have a maximum distance D in a direction parallel to the first optical axis, the image beam comprises a first edge light and a second edge light, the first edge light emits from a point on an edge of the light valve along a direction away from the first optical axis, the second edge light emits from the point on the edge of the light valve along a direction pointing to the first optical axis, the first edge light and the first optical axis in the first lens group have a maximum distance H1 in a direction perpendicular to the first optical axis, the second edge light on the light emitting surface of the second lens group and the first optical axis have a maximum distance H2 in the direction perpendicular to the first optical axis, and (H1+H2)/D<3.

6. A projection lens, configured to image an image beam provided by a light valve disposed on a reduced side onto a projection surface disposed on a magnified side, wherein the light valve has an angle with the projection surface, and the projection lens comprises a first lens group, a second lens group, and an aperture stop, wherein the first lens group is disposed between the reduced side and the magnified side and has a first optical axis;

the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and the aperture stop is disposed between the first lens group and the second lens group, wherein the light valve is configured to provide the image beam, the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;

wherein the aperture stop and the reflective surface of the second lens group have a maximum distance D in a direction parallel to the first optical axis, the light emitting surface of the second lens group has a clear aperture CA, and CA/D<3.

7. A projection lens, configured to image an image beam provided by a light valve disposed on a reduced side onto a projection surface disposed on a magnified side, wherein the light valve has an angle with the projection surface, and the projection lens comprises a first lens group, a second lens group, and an aperture stop, wherein the first lens group is disposed between the reduced side and the magnified side and has a first optical axis;

the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and the aperture stop is disposed between the first lens group and the second lens group, wherein the light valve is configured to provide the image beam, the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;

wherein the image beam forms a projection image on the projection surface, two opposite sides of the projection image are parallel to each other and have a length A and a length B in a direction respectively, the projection image has a maximum width W in the direction, [(B−A)/W]·100%=T, and |T|<1%.

8. A projection apparatus, comprising an illumination light source, a light valve, a projection surface, and a projection lens, wherein the illumination light source is configured to provide an illumination beam;

the light valve is disposed on a reduced side and is configured to convert the illumination beam into an image beam;

the projection surface is disposed on a magnified side, wherein the light valve has an angle with the projection surface;

the projection lens comprises a first lens group, a second lens group, and an aperture stop, wherein the first lens group is disposed between the reduced side and the magnified side and has a first optical axis;

the second lens group is disposed between the first lens group and the magnified side, wherein the second lens group has a light incident surface, a reflective surface, and a light emitting surface, the light incident surface faces the first lens group, the light emitting surface faces the projection surface, the light incident surface, the light emitting surface, and the first lens group are disposed on a same side of the reflective surface, and at least one of the light incident surface, the reflective surface, and the light emitting surface is a freeform surface; and the aperture stop is disposed between the first lens group and the second lens group, wherein the image beam sequentially passes through the first lens group, travels through the aperture stop, passes through the light incident surface of the second lens group, is reflected by the reflective surface of the second lens group, and passes through the light emitting surface of the second lens group to be transmitted to the projection surface, and the first optical axis of the first lens group does not overlap with a center of the image beam;

wherein the second lens group comprises a deflecting prism, and the deflecting prism has the light incident surface, the reflective surface, and the light emitting surface.

9. The projection apparatus according to claim 8, wherein the first lens group comprises a plurality of lenses arranged in sequence from the magnified side to the reduced side, each of the plurality of lenses has a first surface facing the second lens group and a second surface facing the light valve, and a first surface of a lens closest to the aperture stop among the plurality of lenses is a freeform surface.

10. The projection apparatus according to claim 8, wherein the aperture stop and the reflective surface of the second lens group have a maximum distance D in a direction parallel to the first optical axis, the image beam comprises a first edge light and a second edge light, the first edge light emits from a point on an edge of the light valve along a direction away from the first optical axis, the second edge light emits from the point on the edge of the light valve along a direction pointing to the first optical axis, the first edge light and the first optical axis in the first lens group have a maximum distance H1 in a direction perpendicular to the first optical axis, the second edge light on the light emitting surface of the second lens group and the first optical axis have a maximum distance H2 in the direction perpendicular to the first optical axis, and (H1+H2)/D<3.

11. The projection apparatus according to claim 8, wherein the aperture stop and the reflective surface of the second lens group have a maximum distance D in a direction parallel to the first optical axis, the light emitting surface of the second lens group has a clear aperture CA, and CA/D<3.

12. The projection apparatus according to claim 8, wherein the image beam has an offset value relative to the first optical axis of the first lens group.

* * * * *